(12) United States Patent
Kubo (10) Patent No.: US 12,484,773 B2
(45) Date of Patent: Dec. 2, 2025

(54) CHEEK RETRACTOR

(71) Applicant: Kotaro Kubo, Tokyo (JP)

(72) Inventor: Kotaro Kubo, Tokyo (JP)

( * ) Notice: Subject to any disclaimer, the term of this patent is extended or adjusted under 35 U.S.C. 154(b) by 266 days.

(21) Appl. No.: 18/214,134

(22) Filed: Jun. 26, 2023

(65) Prior Publication Data

US 2023/0329544 A1   Oct. 19, 2023

Related U.S. Application Data

(63) Continuation of application No. PCT/JP2022/003748, filed on Feb. 1, 2022.

(30) Foreign Application Priority Data

Jun. 25, 2021   (JP) .................. 2021-105646

(51) Int. Cl.
*A61B 1/32*   (2006.01)
*A61B 90/96*   (2016.01)
(Continued)

(52) U.S. Cl.
CPC ................ *A61B 1/32* (2013.01); *A61B 90/96* (2016.02); *A61C 5/90* (2017.02); *G06K 19/06037* (2013.01)

(58) Field of Classification Search
CPC ..................................................... A61C 5/90
See application file for complete search history.

(56) References Cited

U.S. PATENT DOCUMENTS 5,037,298 A * 8/1991 Hickham ................. A61C 5/90
433/93
6,500,002 B2   12/2002 Horiguchi
(Continued)

FOREIGN PATENT DOCUMENTS

JP   H11-178792 A   7/1999
JP   2002-017670 A   1/2002
(Continued)

OTHER PUBLICATIONS

PCT/ISA/210, "International Search Report for PCT International Application No. PCT/JP2022/003748," Apr. 19, 2022.
(Continued)

*Primary Examiner* — Heidi M Eide
(74) *Attorney, Agent, or Firm* — HAUPTMAN HAM, LLP (57) ABSTRACT

There is obtained a cheek retractor that a right outer flange and a left outer flange are provided with a right personal authentication identification code plate portion and a left personal authentication identification code plate portion, respectively, on which two-dimensional barcodes are printed. Since the cheek retractor is mounted on an oral cavity of a patient by holding an arm, which is close to the right personal authentication identification code plate portion and the left personal authentication identification code plate portion, by hand and by pushing the arm inward against a spring force, and an image including a right personal authentication identification code and a left personal authentication identification code is captured, even without experience, an image can be captured to encompass the entirety of a mouth, and since identification information of the patient can be acquired, who the patient is can be grasped.

4 Claims, 11 Drawing Sheets

(51) Int. Cl.
*A61C 5/90* (2017.01)
*G06K 19/06* (2006.01)

(56) References Cited

U.S. PATENT DOCUMENTS

| | | | | |
|---|---|---|---|---|
| 11,931,597 | B1* | 3/2024 | Alrajhi | A61N 5/1014 |
| 2002/0022211 | A1* | 2/2002 | Horiguchi | A61C 5/90 |
| | | | | 433/140 |
| 2004/0005529 | A1* | 1/2004 | O'Neill | A61C 5/90 |
| | | | | 433/140 |
| 2008/0044796 | A1* | 2/2008 | Hsu | A61C 5/90 |
| | | | | 433/215 |
| 2018/0125610 | A1* | 5/2018 | Carrier, Jr. | A61C 7/002 |
| 2018/0228359 | A1* | 8/2018 | Meyer | A61C 13/34 |
| 2018/0303580 | A1* | 10/2018 | Salah | A61C 1/088 |
| 2020/0297205 | A1* | 9/2020 | Hill | A61B 1/24 |
| 2020/0350053 | A1* | 11/2020 | Cosse | G16H 10/40 |
| 2021/0077238 | A1* | 3/2021 | Kim | A61B 1/32 |
| 2021/0401281 | A1* | 12/2021 | Salah | A61C 9/0053 |

FOREIGN PATENT DOCUMENTS

| | | |
|---|---|---|
| JP | 4486227 B | 6/2010 |
| JP | 2011-030675 A | 2/2011 |

OTHER PUBLICATIONS

Notice of Reasons for Refusal from Japanese Patent Application 2021-105646, Issued on Oct. 14, 2021.

\* cited by examiner

VIEW IN DIRECTION A

PORTION E

FIG. 10C (PORTION D VIEWED FROM ABOVE)

FIG. 12 ns
CHEEK RETRACTOR

RELATED APPLICATIONS

The present application is a continuation of International Application No. PCT/JP2022/003748, filed Feb. 1, 2022, which claims priority from Japanese Patent Application No. 2021-105646, filed Jun. 25, 2021, the disclosures of which applications are hereby incorporated by reference here in their entirety.

TECHNICAL FIELD

The present invention relates to a cheek retractor.

BACKGROUND ART

In recent years, an image of an oral cavity of a patient at the first visit or second visit may be captured, the captured photographic image (hereinafter, referred to as an oral cavity photograph) may be displayed on a computer screen, and how the oral cavity of the patient is expected to change may be explained, and then treatment may be conducted. In addition, a dental chart may be recorded from the oral cavity photograph, may be registered in a dental medical device database together with the oral cavity photograph, and may be used for personal identification in the future.

On the other hand, in recent years, when a dentist determines that remote treatment for a person who is located in a remote area or who cannot visit a hospital is medically feasible under his or her responsibility, the dentist grasps conditions inside an oral cavity or underlying disease information, and then remotely conducts diagnosis, prescription, and the like, which has been more common. There is also a system using a smartphone as imaging and communication means for conducting the diagnosis or prescription.

In such a case, the diagnosis or prescription is conducted using an intraoral photographic image. In order to capture an oral cavity photograph, generally, for example, a cheek retractor as disclosed in Patent Document 1 or Patent Document 2 is used.

CITATION LIST

Patent Document

Patent Document 1: JP 4486227 B2
Patent Document 2: JP 2011-30675 A

SUMMARY OF THE INVENTION

Problem to be Solved by the Invention

However, even when the dental chart is recorded from the oral cavity photograph and is registered in the dental medical device database together with the oral cavity photograph, the collation takes time due to being done manually.

In addition, for example, as in Patent Document 1 and Patent Document 2, the cheek retractor of the related art is only intended to widen a mouth (including lips).

Further, even when the mouth is widened using the cheek retractor, it is not easy to capture an image of the entirety of the mouth including the teeth using an imaging device such as a smartphone such that the captured image is not tilted.

Further, even when the mouth is widened using the cheek retractor, it is not clear what extent of the range should be encompassed in the image according to instructions of a dentist.

An object of the invention is to obtain a cheek retractor that enables not only the merely widening of a mouth but also the capturing of an image of a specified range easily and accurately while preventing the tilting of the captured image of the entirety of the mouth including the teeth, and that enables the identification of a person to whom the oral cavity photograph belongs.

Means for Solving Problem

A cheek retractor according to the invention includes: a pair of right and left cheek hooks for widening a mouth horizontally; and an arm having a substantially U shape and connected to the pair of cheek hooks. The cheek hooks are formed of respective sandwiching members having a crescent shape, connecting respective outer flanges having a crescent shape and located outside the mouth and respective inner flanges having a crescent shape and located inside the mouth, and sandwiched between the respective outer flanges and the respective inner flanges. The right and left outer flanges are provided with respective through-holes for fitting respective identifier portions to respective plate portions having a quadrangular shape, having a predetermined size, and printed or pasted, the identifier portions having a predetermined size, inserted into an oral cavity, and including identifier information for identifying an inserted person. The right and left through-holes are formed at a predetermined interval on vertical lines intersecting a horizontal line at a substantially right angle, the horizontal line passing through centers of the right and left outer flanges. The right and left plate portions include respective protruding pins for a connection to the respective through-holes on one side being a mouth side, and connected to the respective outer flanges.

In addition, in the cheek retractor according to the invention, the identifier portions of the right and left plate portions are printed or pasted such that a straight line passing through upper ends of the identifier portions is substantially parallel to a center line passing through centers of the right and left identifier portions.

In addition, in the cheek retractor according to the invention, vertical protrusions for pulling are formed on outer sides of the right and left plate portions, the outer sides being the other side.

In addition, in the cheek retractor according to the invention, the identification information forms a name, an age, a gender, an address, a telephone number, dentist information, an imaging location, and imaging time information using a two-dimensional barcode or a one-dimensional barcode.

Further, in the cheek retractor according to the invention, a horizontal bar spanning across right and left sides of the arm is connected to the arm. The horizontal bar includes a slider sliding rightward and leftward, and the other end of a colored vertical rod having a predetermined length is fixed to the slider, one end of the vertical rod extending to an upper lip.

Further, in the cheek retractor according to the invention, the horizontal bar and the arm are detachably connected by a pillar member having a predetermined length.

Further, in the cheek retractor according to the invention, gradations are imprinted on the horizontal bar.

Further, in the cheek retractor according to the invention, the gradations are such that integer values or vertical imprints and integer values of the vertical imprints are imprinted at regular intervals on right and left sides with respect to a center of the horizontal bar.

Effect of the Invention

As described above, the invention allows not only the merely widening of the mouth but also the capturing of an image of a specified range easily and accurately while preventing the tilting of captured image of the entirety of the mouth including the teeth, and allows the identification of a person to whom the oral cavity photograph belongs.

BRIEF DESCRIPTION OF DRAWINGS

FIG. 4 is a perspective view of a right cheek hook portion 10a.

MODE(S) FOR CARRYING OUT THE INVENTION

First Embodiment

Figure 1:
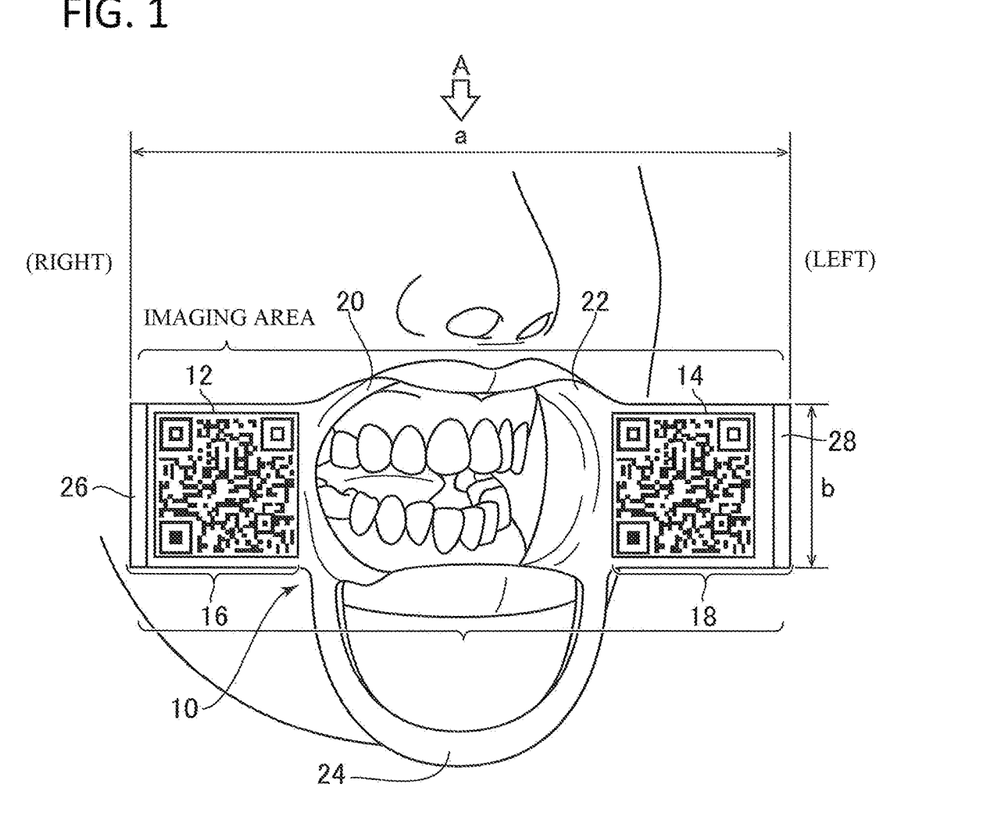
FIG. 1 is a perspective view describing a cheek retractor 10 of a first embodiment.
Figure 2:
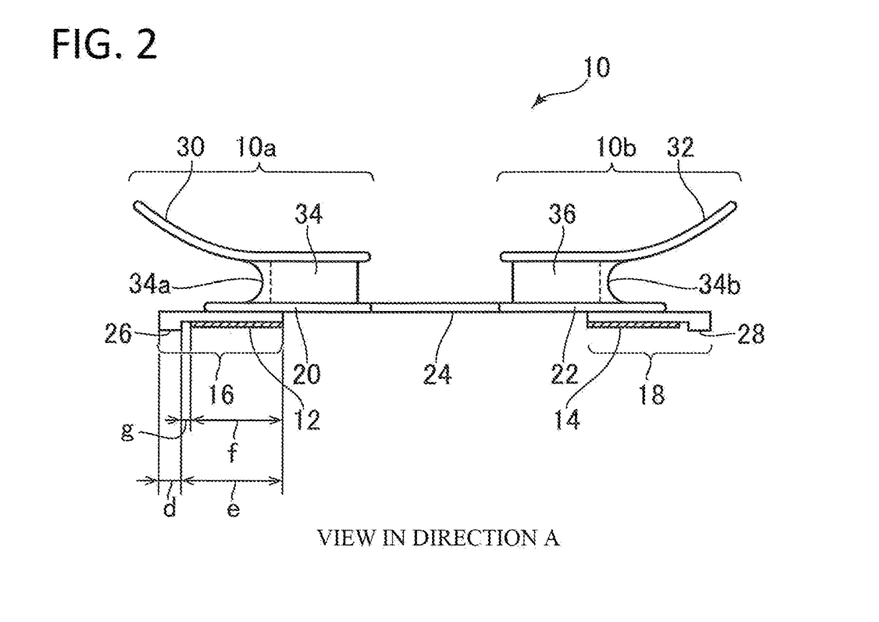
FIG. 2 is a view of the cheek retractor 10 of FIG. 1 when viewed from above (direction A).
Figure 3:
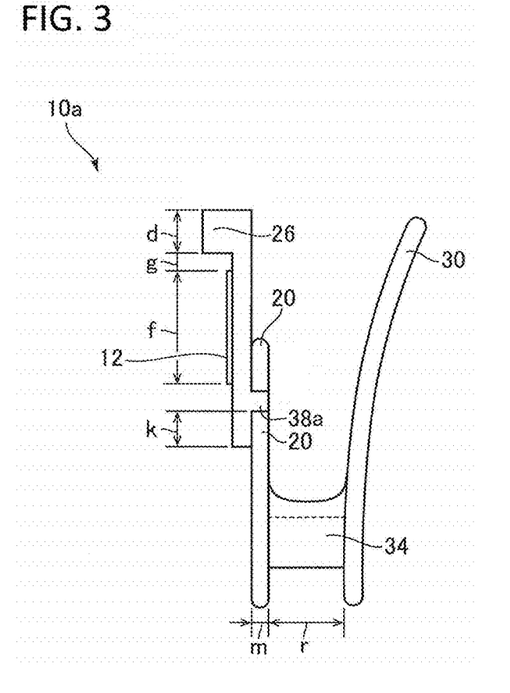
FIG. 3 is a partial enlarged view of FIG. 2.

FIG. 1 is a perspective view describing a cheek (mouth corner) retractor 10 of a first embodiment. FIG. 2 is a view of the cheek retractor 10 of FIG. 1 when viewed from above (direction A). FIG. 3 is a partial enlarged view of FIG. 2. The material of the cheek retractor 10 is a synthetic resin material such as plastic, polycarbonate, polyethylene, or polypropylene.

As shown in FIG. 1, in the cheek retractor 10 of the first embodiment, two-dimensional barcodes (QR codes (registered trademark)) are provided on a right extraoral flange 20 and a left extraoral flange 22 through printing or labeling. The right QR code (registered trademark) is referred to as a right personal authentication identification code 12, and the left QR code is referred to as a left personal authentication identification code 14.

In addition, in the cheek retractor 10, lower sides of a pair of right and left cheek hooks (the right extraoral flange 20 and the left extraoral flange 22) are connected (may be integrally molded) by an arm 24 having a substantially U shape. The arm is also made of an elastic synthetic resin material such as plastic, polycarbonate, polyethylene, or polypropylene.

A plate portion provided with the right personal authentication identification code 12 described above is referred to as a right personal authentication identification code plate portion 16 (also referred to as an identifier portion), and a plate portion provided with the left personal authentication identification code 14 is referred to as a left personal authentication identification code plate portion 18 (also referred to as an identifier portion). Further, the plate portions are provided with respective vertical protrusions. The vertical protrusions are used to further widen a mouth horizontally through pinching with fingers. The right one is referred to as a right vertical protrusion 26, and the left one is referred to as a left vertical protrusion 28.

Incidentally, in FIG. 1, the right personal authentication identification code 12, the right personal authentication identification code plate portion 16, the left personal authentication identification code 14, and the left personal authentication identification code plate portion 18 are shown in an enlarged manner. In addition, the cheek retractor 10 of the first embodiment is such that a horizontal width (a) is approximately 120 mm to 150 mm (preferably 135 mm) and a length from a horizontal line (not shown) passing through an upper end of the right extraoral flange 20 and through an upper end of the left extraoral flange 22 to an end of the arm 24 is 80 mm to 100 mm (preferably approximately 90 mm), and there are medium and small sizes.

On the other hand, when the cheek retractor 10 is used, by holding the arm 24, which is close to the right personal authentication identification code plate portion 16 and the left personal authentication identification code plate portion 18, by hand and by pushing the arm 24 inward against a spring force, a width dimension between cheek hooks is reduced, and then the cheek hooks are inserted into an oral cavity of a patient, and are hooked to both side portions of cheeks (lips).

Then, when the hand is released from the arm 24, the right and left cheek hooks are moved in an opening direction by a restoring force of the spring arm, and the cheeks are pushed and widened rightward and leftward. Accordingly, intraoral examination, treatment, imaging, and the like can be conducted.

Namely, since the barcode plate portions with QR codes (registered trademark) (the right personal authentication identification code plate portion 16 and the left personal authentication identification code plate portion 18) are integrated or connected to the right and left flanges (the right extraoral flange 20 and the left extraoral flange 22), a photographer (nurse, caregiver, remote person (examination requestor), or the like) captures an image including the right personal authentication identification code 12 and the left personal authentication identification code 14, so that an image can be captured to encompass the teeth with the lips widened horizontally and up and down (the entirety of the mouth).

Further, since these right and left barcodes are identification information of a patient (patient address, name, age, gender, telephone number, insurance certificate number, social security number, dentist information provided by cheek hooks, and the like), for example, when an oral cavity image is transmitted to a center via a communication network and is stored, who the patient is can be grasped by analyzing the barcodes (QR codes (registered trademark)) of the captured image.

Furthermore, in the cheek retractor 10 of the first embodiment, the right personal authentication identification code plate portion 16 and the left personal authentication identification code plate portion 18 are provided with respective vertical protrusions. The vertical protrusions are used to further widen a mouth horizontally through pinching with fingers. The right one is referred to as the right vertical protrusion 26, and the left one is referred to as the left vertical protrusion 28.

It is preferable that the sizes of the right personal authentication identification code plate portion 16 and the left personal authentication identification code plate portion 18 are approximately 10 mm to 40 mm (for example, 15 mm or 24 mm) in width (b) (the same applies to length) and 2 mm to 4 mm (for example, 3.5 mm) in thickness.

The mouth can be widened while pinching the right vertical protrusion 26 of the right personal authentication identification code plate portion 16 and the left vertical protrusion 28 of the left personal authentication identification code plate portion 18 with fingers, so that an image of even a deep portion side of the teeth can be captured.

As shown in FIG. 2, in the cheek retractor 10 of the first embodiment, a right cheek hook portion 10a and a left cheek hook portion 10b are molded in pair (only one may be provided).

In the right cheek hook portion 10a, a right intraoral flange 30 and the right extraoral flange 20 are molded with a substantially crescent-shaped member (hereinafter, referred to as a right crescent-shaped member 34) sandwiched therebetween. A thickness of the right crescent-shaped member 34, the same as m shown in FIG. 3, is approximately 2 mm to 4 mm (refer to 34a (for example, 3.5 mm)), and as shown in FIG. 3, a width is approximately r (8 mm to 15 mm preferably 9 mm).

In addition, the right intraoral flange 30 (and the right extraoral flange 20) has a thickness of approximately 2 mm to 4 mm (for example, 3.5 mm). The right intraoral flange 30 (and the right extraoral flange 20) may be curved, or may be formed linearly at an inclination of a small angle (3 degrees to 8 degrees from a horizontal axis) from around 34a shown in FIG. 2.

Now, a distance between a right extraoral flange outer peripheral edge 20a and a right extraoral flange inner peripheral edge 20b of the right extraoral flange 20 of the right cheek hook portion 10a will be described with FIG. 12.

Figure 12:
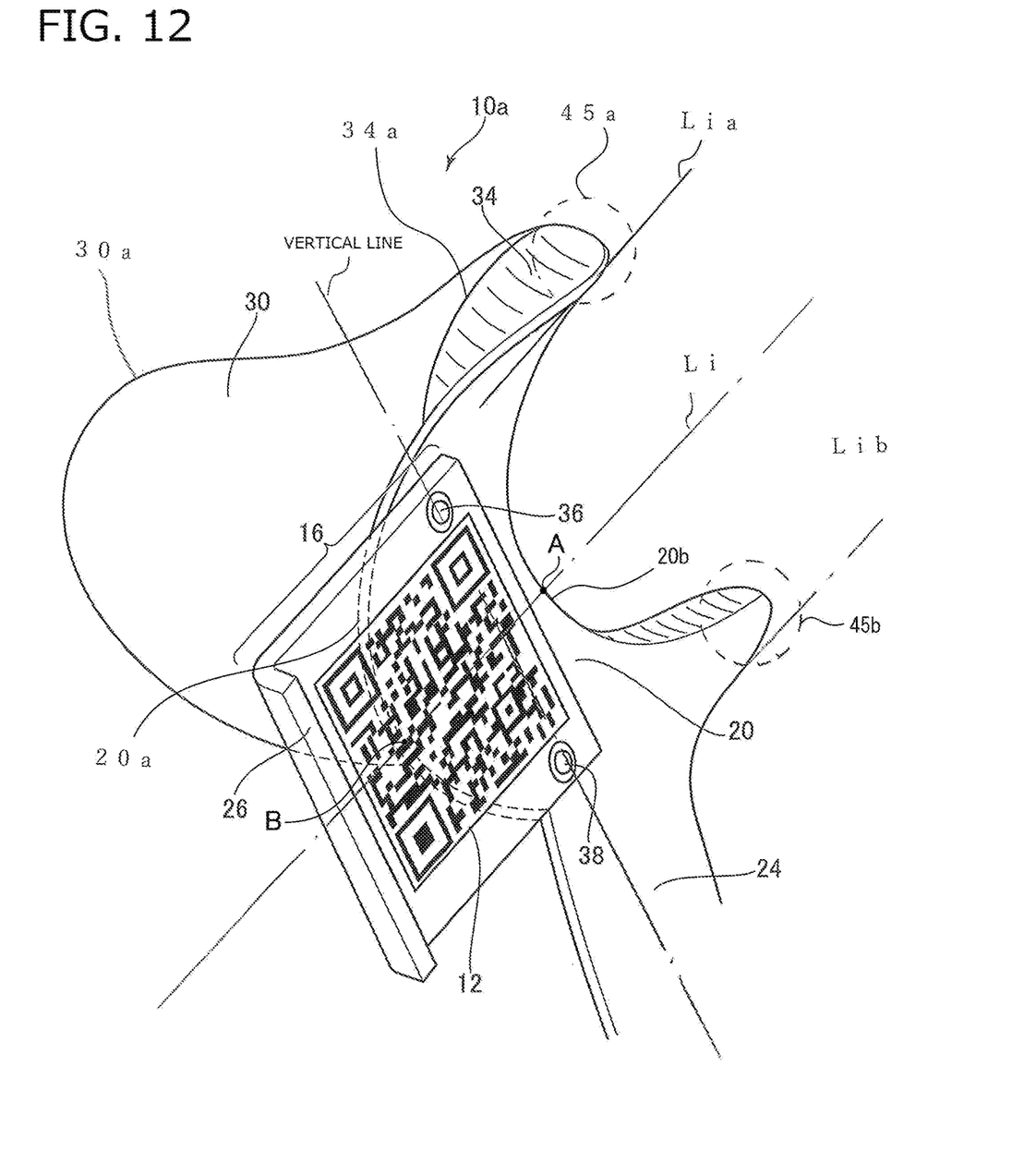
FIG. 12 is a supplementary view supplementing to FIG. 4.

In FIG. 12, the upper protrusion of the right extraoral flange 20 is shown as an upper protrusion 45a and the lower protrusion of the right extraoral flange 20 is shown as a lower protrusion 45b. Also, in FIG. 12, a horizontal line through the upper end of the upper protrusion 45a is shown as a horizontal line Lia, a horizontal line through the lower end of the lower protrusion 45b is shown as a horizontal line Lib. A centerline passing (the center) between the horizontal line Lia and the horizontal line Lib is shown as a centerline Li. The right extraoral flange 20 is formed in a crescent shape and the upper end of the crescent shape corresponds to the upper protrusion 45a and the lower end of the crescent shape corresponds to the lower protrusion 45b. The outer peripheral edge of the right intraoral flange 30 is shown as an intraoral flange outer peripheral edge 30a and the outer peripheral edge of the right extraoral flange 20 is shown as the right extraoral flange outer peripheral edge 20a. In addition, the outer peripheral edge (also called outer surface) of a right crescent-shaped member 34 is shown as a sandwiching member outer peripheral edge 34a. Also, the inner peripheral edge of the right extraoral flange 20 is shown as the right extraoral flange inner peripheral edge 20b. A point on the right extraoral flange inner peripheral edge 20b where the right extraoral flange inner peripheral edge 20b and the centerline Li cross, is shown as a point B. A point on the right extraoral flange outer peripheral edge 20a where the right extraoral flange outer peripheral edge 20a and the centerline Li cross, is shown as a point A. Then, a distance between the point A and the point B may be approximately 10 mm at a maximum (for example, 8 mm). In addition, the radius R (the center point is on the centerline Li) of the right extraoral flange outer peripheral edge 20a may be approximately 18 mm to 22 mm (for example, 20 mm). The radius R (the center point is on the centerline Li) of the right extraoral flange inner peripheral edge 20b may be approximately 13 mm to 18 mm (for example, 16 mm).

Also, a distance between a left extraoral flange outer edge and a left extraoral flange inner edge of the left extraoral flange 22 of the left cheek hook portion 10b is the same as the distance between the right extraoral flange outer edge 20a and the right extraoral flange inner edge 20b of the right extraoral flange 20 of the right cheek hook portion 10a and the explanation is omitted.

On the other hand, as shown in FIG. 2, in the left cheek hook portion 10b, similarly, a left intraoral flange 32 and the left extraoral flange 22 are molded with a substantially crescent-shaped member (hereinafter, referred to as the left crescent-shaped member 34) sandwiched therebetween. A thickness of the left crescent-shaped member 34 is also approximately 2 mm to 4 mm (refer to 34b).

In addition, as shown in FIG. 2, the right intraoral flange 30 and the left intraoral flange 32 are curved in an inward direction, and the right extraoral flange 20 and the left extraoral flange 22 are straight (may be slightly curved inward).

Furthermore, the right personal authentication identification code plate portion 16 is connected to the right extraoral flange 20, and the left personal authentication identification code plate portion 18 is connected to the left outer flange 22 (may be integrally molded).

The right cheek hook portion 10a (since the left cheek hook portion 10b has the same configuration, a description thereof will be omitted) will be described with reference to FIG. 3.

The right personal authentication identification code plate portion 16 is connected to the right extraoral flange 20 by right pins 36 (also referred to as protruding pins) (may be fixed by an adhesive agent). It is preferable that a diameter of the right pins 36 (left pin) is approximately 3 mm to 5 mm (for example, 4 mm).

It is preferable that the right vertical protrusion 26 of the right personal authentication identification code plate portion 16 has a horizontal width d of approximately 3 mm to 4 mm. In addition, a portion (f) of the right personal authentication identification code 12 of the right personal authentication identification code plate portion 16 is printed or pasted (is preferably printed on the white color) with an interval (g) of 2 mm to 3 mm from the right vertical protrusion 26.

In addition, a distance from left ends of the right pins 36 to a left end of the right personal authentication identification code plate portion 16 is approximately "k" mm (5 mm to 8 mm).

Figure 4:
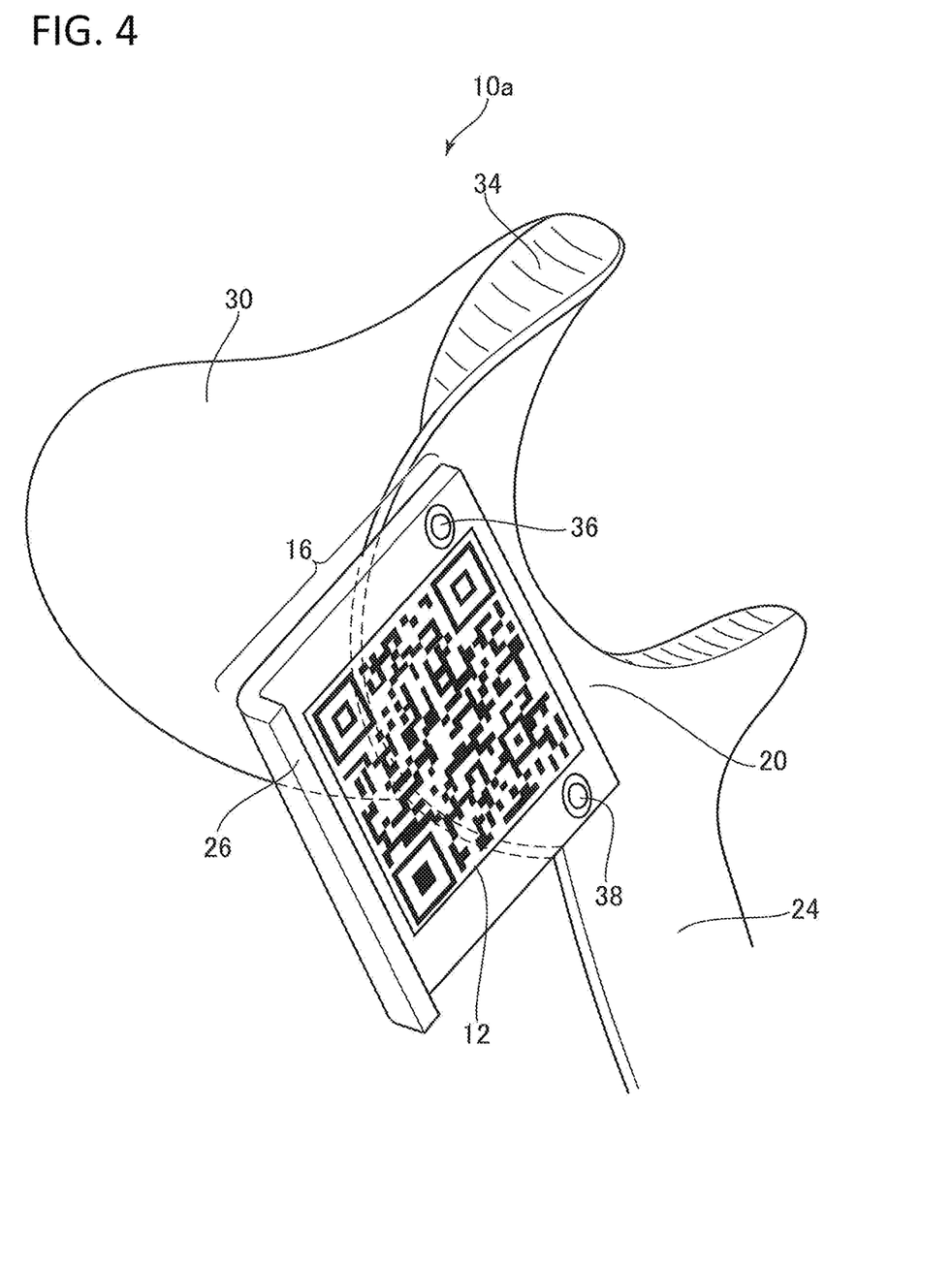

FIG. 4 is a perspective view of the right cheek hook portion 10a. Incidentally, FIG. 4 shows an example in which the right personal authentication identification code plate portion 16 is connected to the right extraoral flange 20 by the right pins 36 (36a and 36b). Effects of connection using the right pins 36 (36a and 36b: protrusions) will be described.

Incidentally, holes (not shown: approximately 3 mm to 5 mm in diameter [preferably approximately 0.1 mm to 0.3 mm smaller than 3 mm to 5 mm]) for fitting the right pins 36 (36a and 36b) are through-molded.

Incidentally, the holes (an upper hole and a lower hole) are provided on a vertical line (not shown) passing through a horizontal line Li (refer to FIG. 9) at a right angle (may be shifted by approximately 1 mm or 2 mm) at positions 5 mm to 9 mm (preferably 6 mm) above or below a center of the right extraoral flange 20 (may be shifted by approximately 1 mm or 2 mm), the horizontal line Li passing through the center described above.

When the cheek retractor 10 is used, by holding the arm 24, which is close to the right personal authentication identification code plate portion 16 and the left personal authentication identification code plate portion 18, by hand and by pushing the arm 24 inward against the spring force, the width dimension between the cheek hooks is reduced, and then the cheek hooks are inserted into an oral cavity of a patient, and are hooked to both side portions of cheeks (lips); however, in the present embodiment, since the right cheek hook portion 10a with a QR code (registered trademark) (since the left cheek hook portion 10b has the same configuration, a description thereof will be omitted) is employed, the right cheek hook portion 10a (since the left cheek hook portion 10b has the same configuration, a description thereof will be omitted) may become an obstacle and may make insertion difficult.

For this reason, after the cheek hooks are inserted into the oral cavity of the patient and are hooked to both the side portions of the cheeks (lips), the right personal authentication identification code plate portion 16 is connected by the right pins 36 (36a and 36b), so that such a problem can be solved.

Other Embodiments

Figure 5:
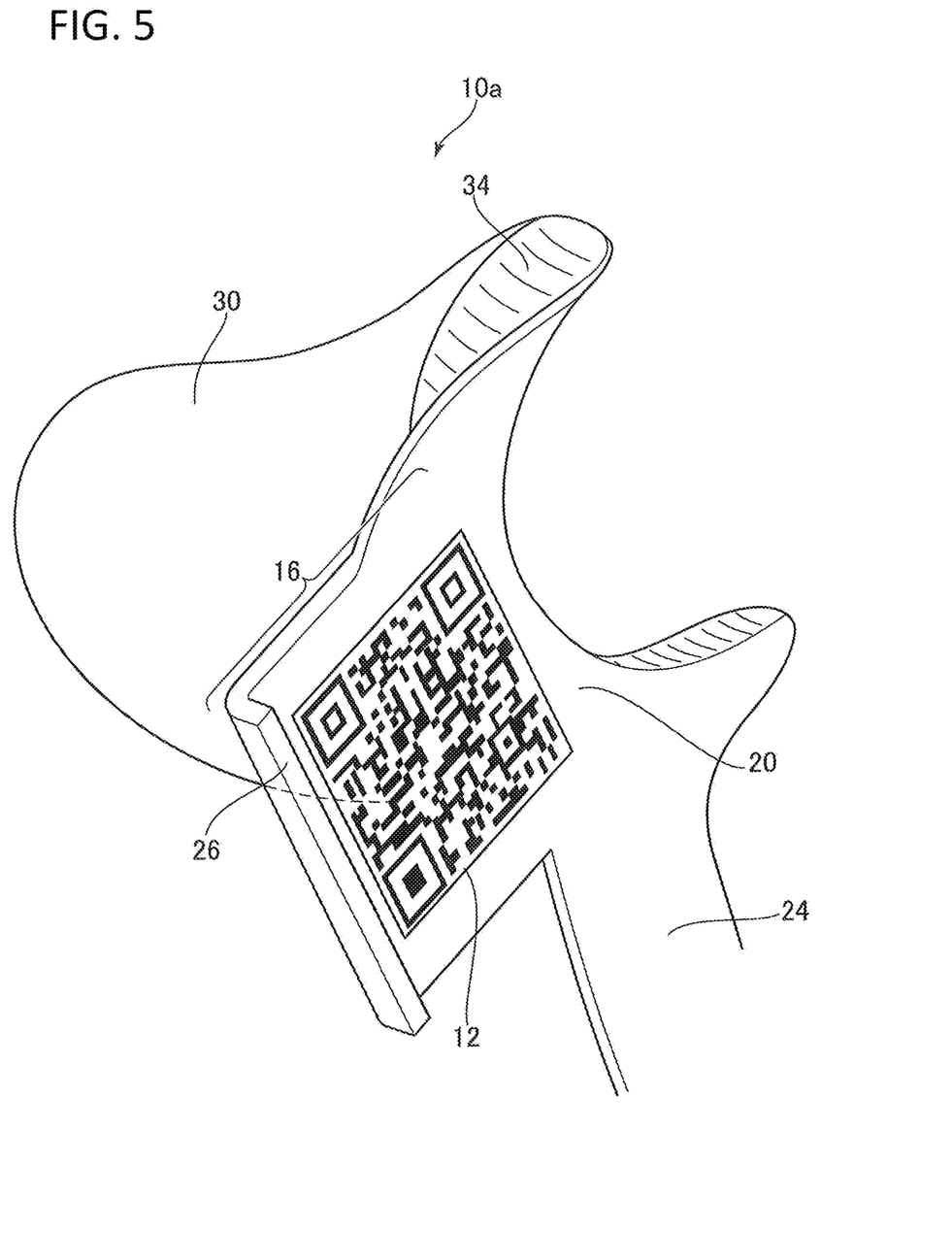
FIG. 5 is a perspective view showing a case where a right extraoral flange 20 and a right personal authentication identification code plate portion 16 with a QR code (registered trademark) are integrally molded.

FIG. 5 is a perspective view showing a case where the right extraoral flange 20 and the right personal authentication identification code plate portion 16 with a QR code (registered trademark) are integrally molded.

Figure 6:
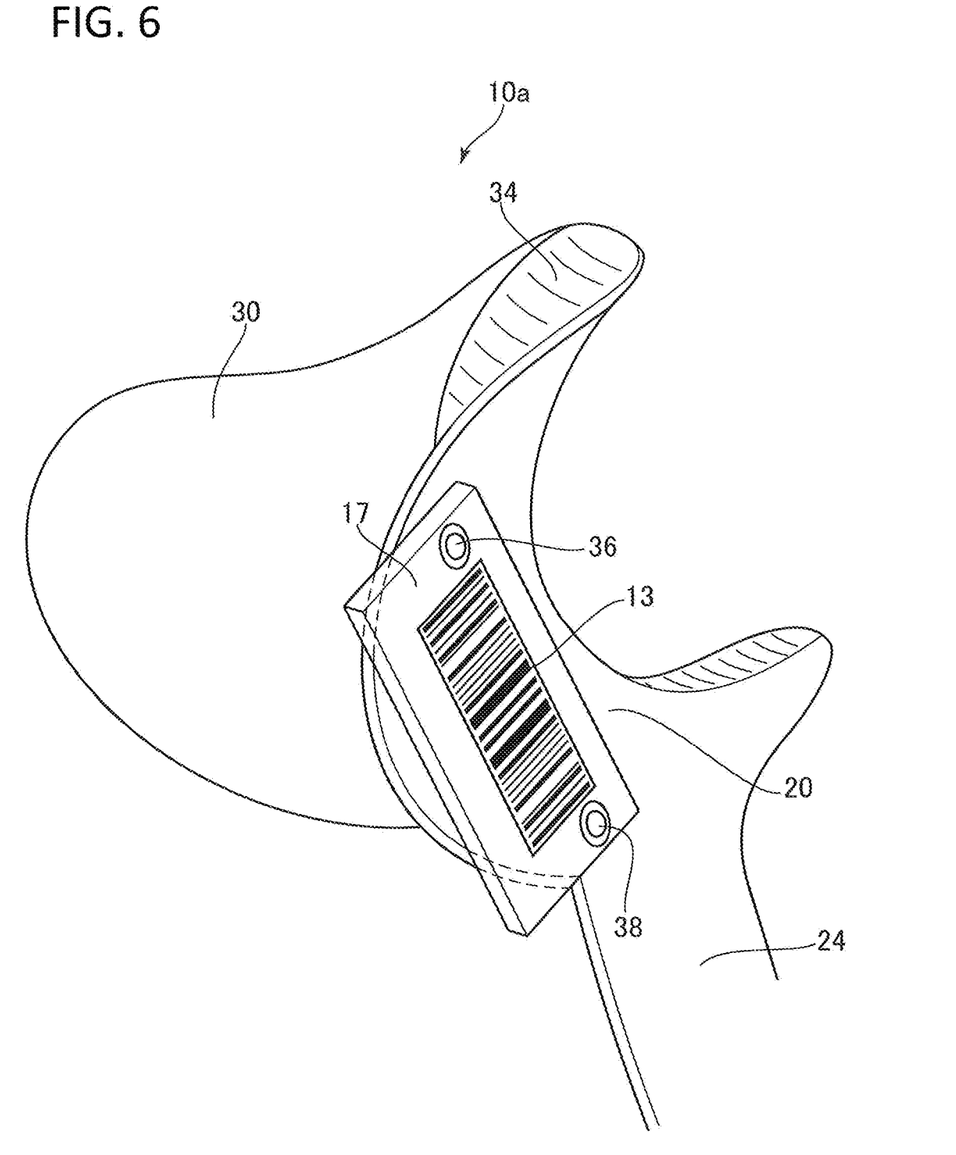
FIG. 6 is a perspective view of an example in which a right personal authentication identification code plate 17 with a one-dimensional barcode 13 (since a left one has the same configuration, a description thereof will be omitted) is employed.

FIG. 6 is a perspective view of an example in which instead of the right personal authentication identification code plate portion 16 with a QR code (registered trademark), a right personal authentication identification code plate 17 with a one-dimensional barcode 13 (since a left one has the same configuration, a description thereof will be omitted) is employed. The right personal authentication identification code plate 17 (approximately 15 mm to 30 mm in height and approximately 8 mm to 15 mm in width) is connected to the right extraoral flange 20 by the right pins 36 (36a and 36b) (may be integrally molded).

In the case of providing barcode plates with the one-dimensional barcodes 13 on both right and left sides, the width thereof is substantially the same as that of the right and left outer flanges (20 and 22).

In addition, when an image of the cheek retractor of FIG. 6 is captured using an imaging device such as a smartphone or a camera, a horizontal line can be displayed on a screen of the imaging device, and a horizontal bar in the vicinity of a center between the right and left one-dimensional barcodes can be easily aligned with the horizontal line. In addition, since the width is also narrower than that of the QR codes (registered trademark), an image of the entirety of the mouth becomes easily captured using the imaging device.

Figure 7:
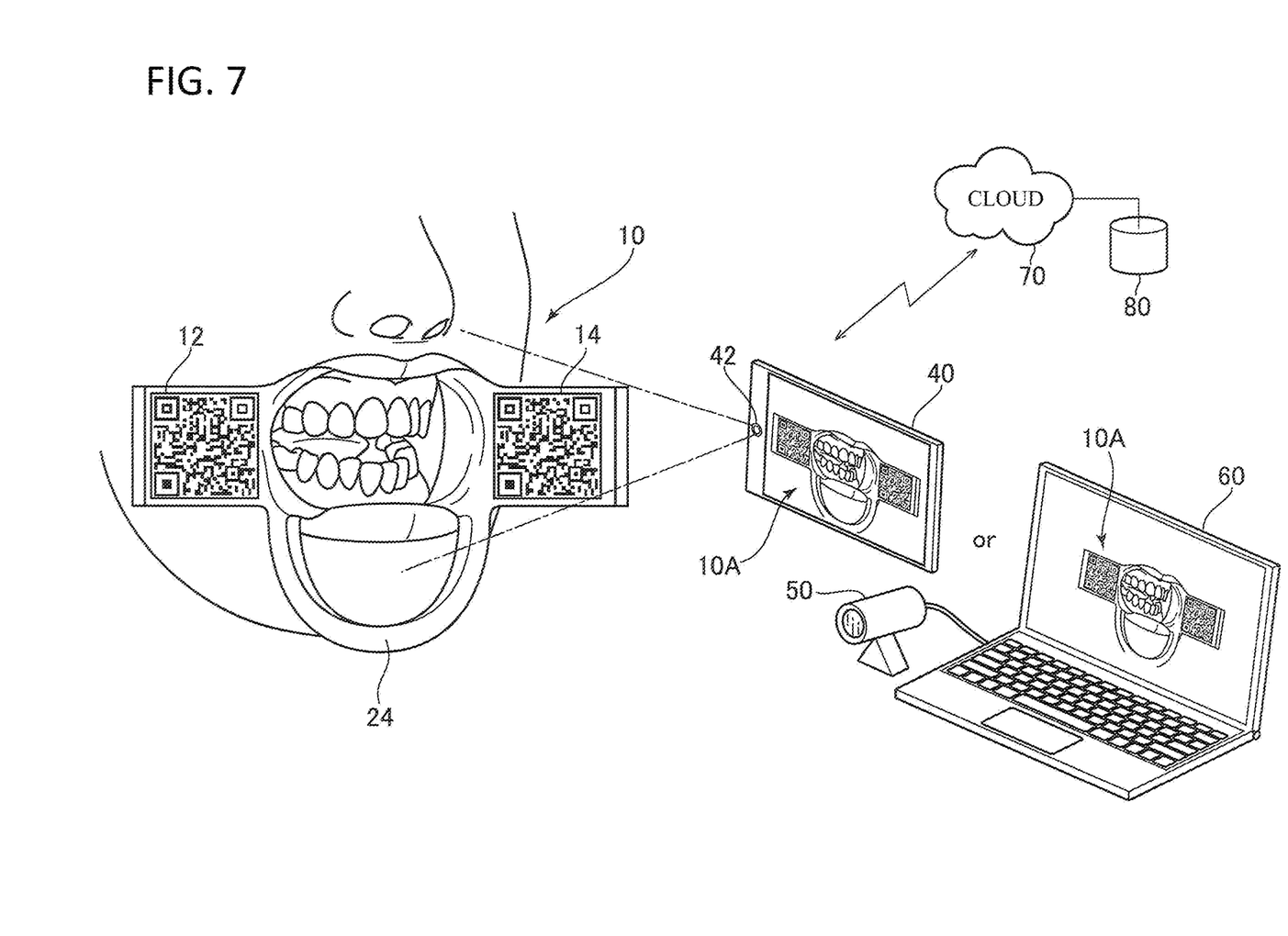
FIG. 7 is a descriptive view (1) of a usage example of the cheek retractor 10 of the present embodiment.

FIG. 7 is a descriptive view of a usage example of the cheek retractor 10 of the present embodiment, and shows an example of remote dental treatment or the like. The cheek retractor 10 of the present embodiment is mounted on a mouth of a patient.

Then, an image is captured using a camera 42 of a smartphone (hereinafter, referred to as a smartphone 40) or a camera 50 connected to a personal computer 60. As shown on the smartphone 40 or the personal computer 60 of FIG. 7, a screen displays an image of the cheek retractor 10 with QR codes (registered trademark) (hereinafter, referred to as a cheek retractor oral cavity photograph 10A with an identifier) mounted on the mouth of the patient.

The cheek retractor oral cavity photograph 10A with an identifier is transmitted to an authentication site 80 (server) via a communication network 70 (dedicated line, internet line, or the like). For this transmission, a screen for inputting patient identification information (not shown) (name, telephone number, mail address, age, and gender) is displayed, and the patient identification information is added and transmitted with the cheek retractor oral cavity photograph 10A with an identifier.

At the authentication site 80, the cheek retractor oral cavity photograph 10A with an identifier is stored in a memory (including the patient identification information), and characteristic points such as a shape of the mouth and a shape and alignment of the teeth included in the cheek retractor oral cavity photograph 10A with an identifier (hereinafter, collectively referred to as dental information) are obtained and stored as authentication information.

Then, for some reasons, when an image of a mouth that is captured with the mouth open (hereinafter, referred to as an examination image) is sent from a public institution via a communication network, characteristic points such as a shape of the mouth and a shape and alignment of the teeth (hereinafter, examination image characteristics) are obtained from an image in a state where the mouth is open (it is preferable that cheek retractors are used) included in the examination image, and the examination image characteristic points and the characteristic points of the authentication information are collated with each other to determine whether or not the dental information is for the same person. When it is determined that the dental information is the same, someone (address, telephone number, name, age, gender, dentist information provided by a cheek retractor, and the like) is detected by collating the dental information with the patient identification information (QR code (registered trademark) or one-dimensional barcode) included in the authentication information.

Figure 8A:
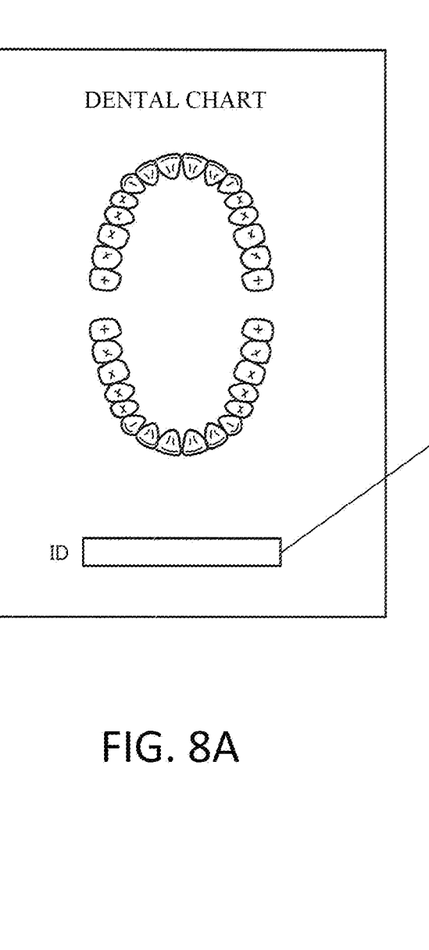
FIGS. 8A and 8B are descriptive views (2) of a usage example of the cheek retractor 10 of the present embodiment.
Figure 8B:
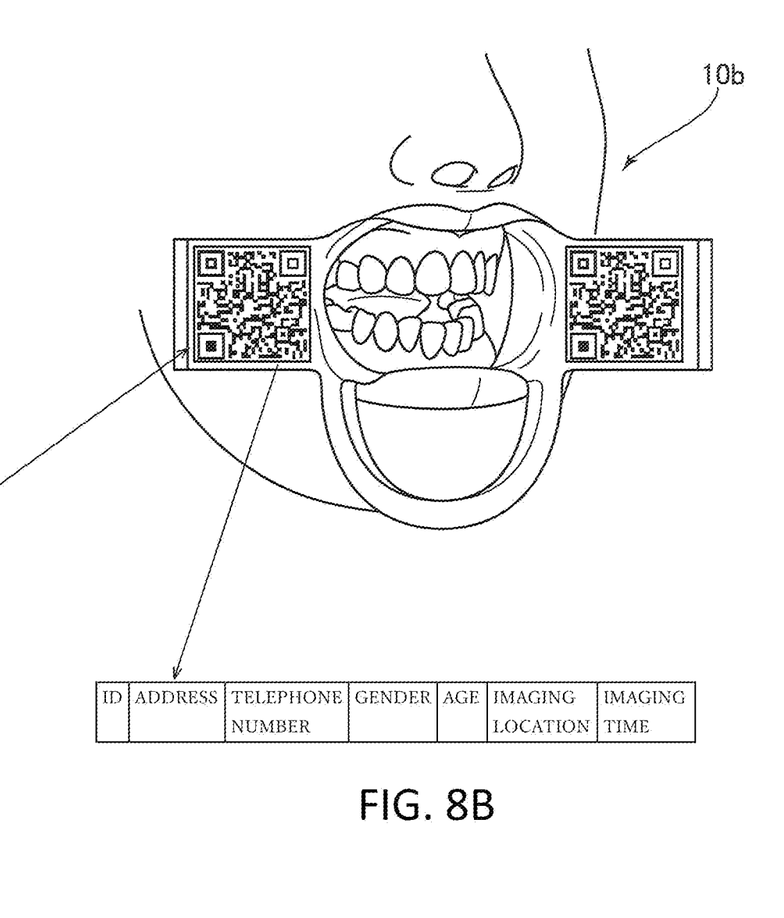

The cheek retractor oral cavity photograph 10A with an identifier described above is transmitted to a dentist terminal (not shown) (including a server and a personal computer), and a dentist side writes necessary items (the number of teeth, the presence or absence and alignment of cavities, observations, and the like) in a dental chart shown in FIGS. 8A and 8B. A patient ID code is written in the dental chart.

Furthermore, it is preferable that the dentist terminal is operated to associate and register the cheek retractor oral cavity photograph 10A with an identifier. Therefore, when the examination image is transmitted with the dental chart at the time (with the cheek retractor oral cavity photograph 10A) included therein, the collation accuracy can be further improved by collating the dental chart with a dental chart (with the cheek retractor oral cavity photograph 10A) stored in advance.

Second Embodiment

When a dentist captures a cheek hook photograph, the dentist may want to capture an image of the entirety of a mouth, both sides, and a deep tooth side. However, in remote situations, a patient may not know which area is referred to, and even a dentist side may be confused in instructing a range to be captured. A second embodiment solves such a problem.

Figure 9:
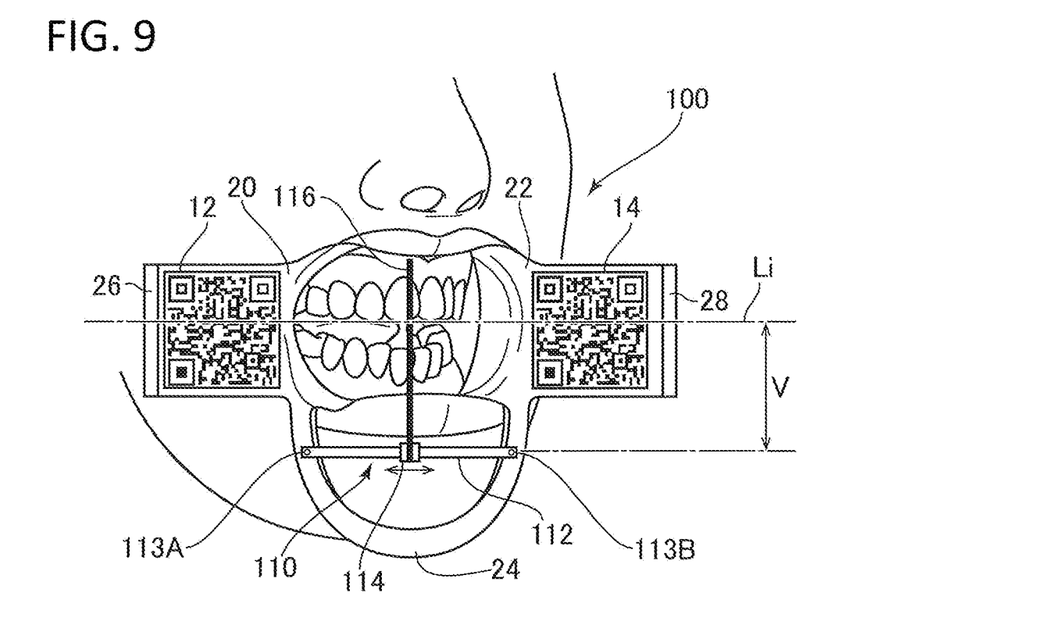
FIG. 9 is a perspective view describing a cheek retractor 100 of a second embodiment.

FIG. 9 is a perspective view describing a cheek retractor 100 of the second embodiment. FIGS. 10A, 10B, 10C and 11 are detailed descriptive views of the cheek retractor 100 of the second embodiment.

In the cheek retractor 100 of the second embodiment, a horizontal bar 112 with a slider 114 with a vertical rod 116 is connected to the arm 24. The material of the cheek retractor 100 is a synthetic resin material such as plastic, polycarbonate, polyethylene, or polypropylene.

Figure 10A:
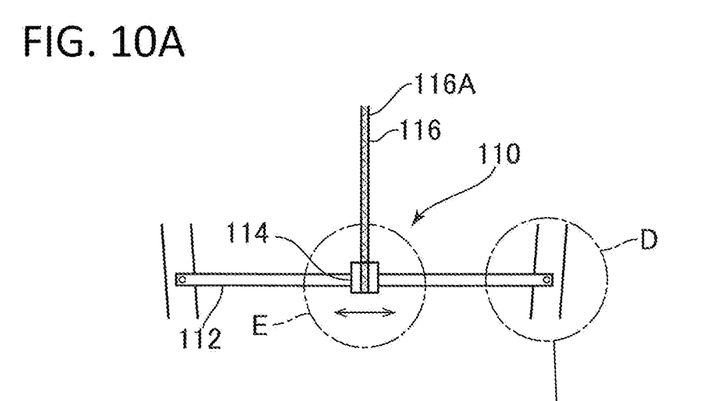
FIGS. 10A, 10B and 10C are detailed descriptive views (1) of the cheek retractor 100 of the second embodiment.
Figure 10B:
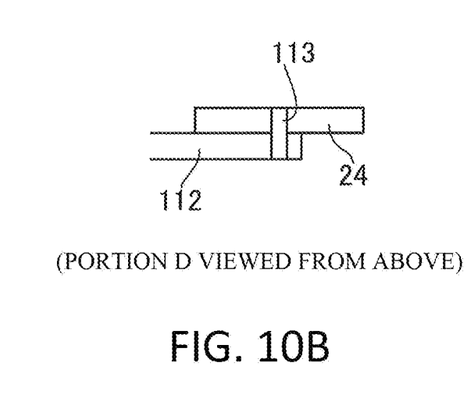
Figure 10C:
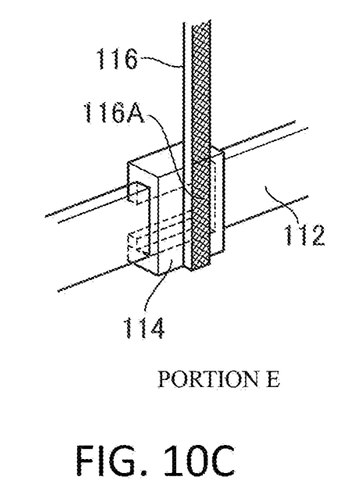

As shown in FIGS. 9, 10 (a), and 10 (c), a color 116A is applied to a surface of the vertical rod 116 (3 mm to 5 mm in width and 30 mm to 55 mm in vertical length). In addition, although not shown, gradations (intervals of 5 mm or 1 cm) are marked on the horizontal bar 112 in a range across right and left ends.

For example, integers: "1", "2", "3", "4" . . . are imprinted, for example, at intervals of 1 cm from a center (reference position) between both ends (an inner end or an outer end) of the horizontal bar 112 to the right and left. It is preferable that "−1", "−2", "−3", "−4" . . . are imprinted on the right side and "+1", "+2", "+3", "+4" are imprinted on the left side. Further, gradations may be imprinted at intervals of 1 cm together with these numbers, and 5 mm gradations may be imprinted within each cm unit. Incidentally, it is preferable that "0" is imprinted at the reference position.

Alternatively, 1 cm, 2 cm, 3 cm, 4 cm, 5 cm, 6 cm, 7 cm . . . and gradations are imprinted from one end (the inner end or the outer end) of the horizontal bar 112 to the right and left, and 5 mm gradations are imprinted within each cm unit.

As shown in FIG. 9, pins 113 (113A and 113B) are provided at end portions (both right and left end portions) of the horizontal bar 112, and a center between the pins 113 (113A and 113B) is located approximately J mm (20 mm to 50 mm for example, 40 mm) below the horizontal line Li passing through the center of the right extraoral flange 20 of the right cheek hook portion 10a and through a center of the left extraoral flange 22 of the left cheek hook portion 10b.

In addition, as shown in FIGS. 9 and 10A, at an area 110 emphasized by a circle E, the slider 114 is slidable rightward and leftward (refer to FIG. 10C). Further, as shown in FIG. 10B, the pins 113 (113A and 113B) are detachably provided at the end portions (both right and left end portions) of the horizontal bar 112 (may be fixed, but are preferably attachable and detachable). It is preferable that the pins 113 are plastic driving pins or screws.

Figure 11:
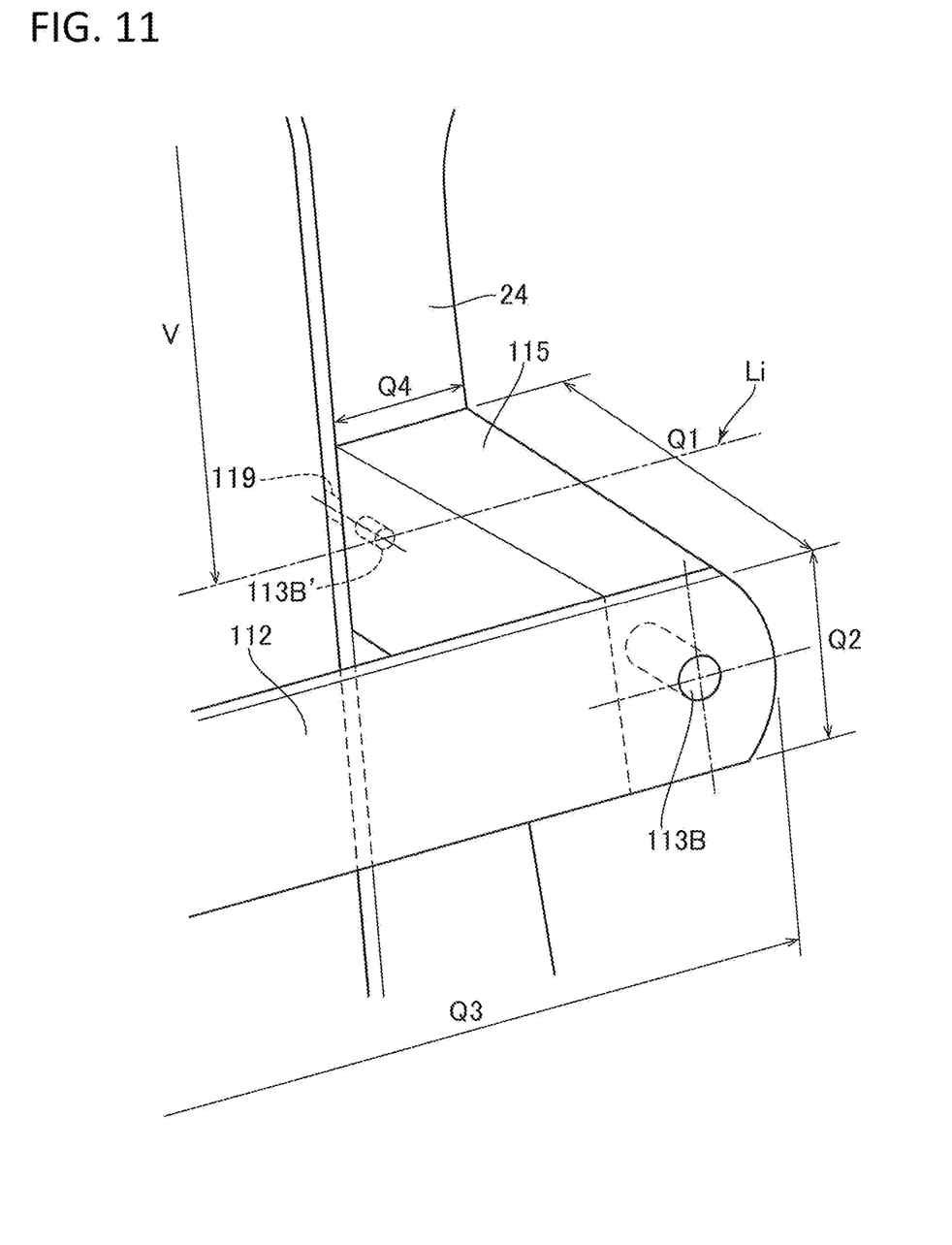
FIG. 11 is a detailed descriptive view (2) of the cheek retractor 100 of the second embodiment.

In addition, as shown in FIG. 11 (showing the left side), the horizontal bar 112 (is preferably straight but, may be slightly curved) is separated from the arm 24 by an interval of approximately Q1 (for example, 10 mm to 30 mm) by a pillar 115. It is preferable that Q2 is approximately 5 mm to 10 mm, Q3 is approximately 70 mm to 120 mm, and Q4 is approximately 5 mm to 10 mm.

Incidentally, connection is performed by the left pin 113B (the right one is 113A: it is preferable that the right pin 113A is a plastic driving pin or screw). In addition, holes 119 (for example, approximately 2 mm to 4 mm in diameter [for example, 3 mm]) are molded in the arm 24 at the positions (both right and left positions) located approximately J mm (20 mm to 50 mm for example, 40 mm) below the horizontal line Li (not shown) passing through the centers, and on the other hand, a left locking pin 113B' having a protruding shape (the same is applied to the right one) is molded on a surface side of the pillar 115 in contact with the arm 24, and the pillar 115 is connected and fixed to the arm 24.

Incidentally, the material of the horizontal bar 112 may be, for example, polyamide resin (66 nylon) so as to be curvable.

Namely, even when the arm 24 is placed on a chin, since a length of the pillar 115 is approximately Q1 (for example, 10 mm to 30 mm), the vertical rod 116 does not hit the lips even when the slider 114 (recessed shape) is moved.

In addition, since connection is performed by the left pin 113B (the right one is 113A), as in the first embodiment, the width dimension between cheek hooks may be reduced by holding the arm 24 of the cheek retractor 100 by hand and by pushing the arm 24 inward against the spring force, and then the cheek hooks may be inserted into an oral cavity of a patient, may be hooked to both side portions of cheeks (lips), and may be mounted thereon by releasing the hand from the arm 24, the right or left pillar of the horizontal bar 112 with the slider 114 with the vertical rod 116 (with the pillars 115 (right and left)) and the arm 24 may be connected by the pin (left locking pin 113B' (the same is applied to the right one)), and thereafter, the right or left pillar may be connected thereto by the pin.

Therefore, when the slider 114 is moved to a position (for example, several centimeters from the right) instructed by a doctor, the vertical rod 116 becomes located on a tooth at the position, so that an image including the right or left QR code (registered trademark) can be captured using an imaging device.

Furthermore, when the captured image with a QR code (registered trademark), for example, an oral cavity image is transmitted to a center via a communication network and is stored, who the patient is can be grasped by analyzing the barcode (QR code (registered trademark)) of the captured image.

Incidentally, it is preferable that the vertical and horizontal size of the right or left personal authentication identification code plate portion is approximately 8 mm, 12 mm, 13 mm, 22.5 mm, 24.5 mm, or 28.5 mm when a QR code (registered trademark) is printed or pasted.

Incidentally, the pins (36, 38, and 113) may be plastic lock pins, rivet pins, or the like.

Further, the right and left identifier portions (for example, 16 and 18) may have different sizes. For example, the size on the right side may be 10 mm×10 mm which is smaller, and the size on the left side may be approximately 20 mm×20 mm which is larger. Therefore, the right and left identifier portions can adapt to the conditions of right and left cheeks and lips.

It is preferable that the printing of a QR code (registered trademark) or a one-dimensional barcode is performed by letterpress printing, offset printing, gravure printing, 3D printer, laser marker printer, thermal printer, or the like.

In addition, a quadrangular pillar is provided as an example of the pillar, but a round pillar (including an elliptical shape) may be used. Further, the personal authentication identification code plate portion may have a circular shape or an elliptical shape.

INDUSTRIAL APPLICABILITY

The invention can be used for identifying a person.

What is claimed is:
1. A cheek retractor comprising:
a cheek hook having a right cheek hook part and a left cheek hook part for widening a mouth of a user horizontally; and an arm having a substantially U shape and connecting the right cheek hook part to the left cheek hook part of the of cheek hook, wherein each of the right cheek hook part and the left cheek hook part of the cheek hook includes a crescent shaped outer flange configured to be located outside the mouth when the cheek retractor is mounted on the mouth of the user and a crescent shaped inner flange configured to be located inside the mouth of the user, and a crescent member is configured to be located between the outer flange and the inner flange, each of the inner flange and the outer flange includes a plurality of through holes connecting to respective protruding pins on each of left and right plate portions, each of the plate portions having a quadrangular shape and a predetermined size, an identifier portion including an identifier information of the user, the identifier portion having a predetermined size and printed or pasted on each of the plate portions disposed on the outer flange, through holes of the plurality of through-holes are formed at a predetermined interval on vertical lines intersecting a horizontal line at a substantially right angle, the horizontal line passing through centers of the outer flange of the right cheek hook part and the outer flange of the left cheek hook part, and each of the plate portions includes a plurality of the protruding pins for a connection to the respective through-holes on a side facing the mouth of the user when the cheek retractor is mounted in the mouth, and connected to the respective outer flanges.

2. The cheek retractor according to claim 1, wherein the identifier portion of each of the plate portions is printed or pasted such that a straight line passing through upper ends of the identifier portions is substantially parallel to a center line passing through centers of the respective one of the left identifier portions.

3. The cheek retractor according to claim 1, wherein vertical protrusions for pulling are formed on outer sides of the right and left plate portions, the outer sides being the side opposite to the side having the protruding pins.

4. The cheek retractor according to claim 1, wherein the identification information includes at least one of or any combination of a name, an age, a gender, an address, a telephone number, dentist information, an imaging location, or imaging time information using a two-dimensional barcode or a one-dimensional barcode.

* * * * *